United States Patent [19]

Sampson

[11] Patent Number: 4,819,504
[45] Date of Patent: Apr. 11, 1989

[54] SELF CONTAINED BRAKING SYSTEM FOR BICYCLE PEDALS

[75] Inventor: Eric A. Sampson, Denver, Colo.
[73] Assignee: Sampson Sports, Inc., Denver, Colo.
[21] Appl. No.: 54,577
[22] Filed: May 27, 1987
[51] Int. Cl.⁴ .......................... G05G 1/14; B62M 3/08
[52] U.S. Cl. .................................. 74/594.4; 74/594.6
[58] Field of Search .................... 74/594.6, 594.5, 560, 74/594.1, 594.4, 594.7; 36/131, 132

[56] References Cited

U.S. PATENT DOCUMENTS

| 351,880 | 11/1886 | Merrill | 74/594.6 |
|---|---|---|---|
| 391,212 | 10/1888 | Torkelson | 74/594.5 |
| 535,065 | 3/1895 | Lester | 74/594.6 |
| 565,788 | 8/1896 | Otis | 74/594.6 |
| 4,103,563 | 8/1978 | Genzling | 74/560 X |
| 4,665,767 | 5/1987 | Lassche | 74/594.6 |

FOREIGN PATENT DOCUMENTS

| 146454 | 6/1985 | European Pat. Off. | |
|---|---|---|---|
| 121309 | 6/1901 | Fed. Rep. of Germany | 74/594.6 |
| 2553370 | 4/1985 | France | 74/594.6 |
| 259019 | 5/1949 | Switzerland | 74/594.4 |

*Primary Examiner*—Gary L. Smith
*Assistant Examiner*—Rodney M. Lindsey
*Attorney, Agent, or Firm*—Dorr, Carson, Sloan & Peterson

[57] ABSTRACT

A pedal system equipped with braking apparatus which inhibits rotation of a pedal body about an axle when the pedal body is not engaged with the shoe of a cyclist. The brake system is released to permit normal pedal rotation when the shoe of a cyclist engages with the pedal body.

9 Claims, 4 Drawing Sheets

SELF CONTAINED BRAKING SYSTEM FOR BICYCLE PEDALS

FIELD OF THE INVENTION

This invention relates to apparatus that prevents a bicycle pedal from rotating about its axis when the bicycle rider removes his foot from the pedal.

RELATED APPLICATION

This application is related to a co-pending application Ser. No. 016,277, filed Feb. 19, 1987 and listing Eric A. Sampson as inventor.

BACKGROUND OF THE INVENTION

Numerous bicycle pedal arrangements are known in the art. The most common arrangement is the basic "block" pedal which consists of a hard rubber or plastic block which revolves around an axle affixed to a bicycle crank arm. These pedals are typically found on children's and other low performance inexpensive bicycles. An improved pedal is termed the "quill" pedal. The quill pedal has a main axle attached to the bicycle crank arm. The quill pedal also has approximately one inch metal extensions to which metal parallel cage plates are attached at the front and rear of the pedal.

In order to operate both the block and the quill pedals, a rider simply pushes his foot against the pedal. Only limited performance is obtainable from these pedals since the cyclist can generate pedaling power only by a pushing motion of his feet.

Attempts have been made to improve the performance of the block and quill pedals. One such attempt involves the addition of a toe clip comprising a thin metal or plastic attachment to the front of the pedal. The toe clip is shaped like the toe of a shoe and it functions to prevent a cyclist's shoe, when inserted into the clip, from slipping off the pedal. The toe clip may also be used with a strap and buckle arrangement which encircles the pedal and the rider's shoe. This permits the cyclist's feet to generate power with both a pushing and pulling motion.

Although toe clips and straps greatly increase pedaling efficiency, they also create some difficulties. The cage plate of the quill pedal rotates on an axis affixed to the crank arm of the bicycle. The natural resting position of a pedal equipped with a toe clip and strap, because of gravity, is approximately 180 degrees from the position in which the pedal is used when engaged with a cyclist's foot. In order to use the pedal, the rider must manually flip the pedal around its axle in order to place his shoe into the space between the top of the pedal and the toe clip.

New pedal systems which eliminate toe clips and straps are currently available. These systems typically incorporate a special cleat which is mounted on a cyclist's shoe and which is adapted to be matingly engaged with a special pedal body. These new systems allow a rider's shoe to exert pushing and pulling forces and, at the same time, eliminate toe clips and straps. However, these new systems are also attached to an axle which connects the pedal to the bicycle crank arm. As a result of gravity and pedal weighting, numerous problems are still encountered. The most common problem is that if the rider is not skilled at placing his foot cleat into the pedal, the pedal will rotate about its axis when it is first touched by the rider's foot. This makes entry into the pedal difficult. Although recent attempts have been made to solve the above-identified problem by balancing the pedal system, there still remains a problem in that if the rider does not place his shoe or his shoe cleat with precision into the pedal body on the first effort, the pedal body will spin about its axis.

It can therefore be seen that the presently available systems do not adequately provide an ease of entry for a cyclist who wishes to engage his shoe cleat with a pedal body.

SUMMARY OF THE INVENTION

The present invention solves the above-discussed problems and achieves a technical advance in the art by providing apparatus that improves the ease of entry of different types of bicycle pedal systems. More specifically, the present invention provides brake apparatus for stopping a bicycle pedal from rotating about its axis when it is not in use and which does not create any increased pedaling effort when the pedal system is used by a cyclist.

The present invention can be embodied by different apparatus and different types of pedal systems. All of these embody the general principles of the invention. In each embodiment, there is a tensioned brake member having either one end or a portion of the brake member in contact with the pedal axle when the pedal is not engaged with a cyclist's foot. At such times, the brake member contacts the pedal axle with sufficient force so as to inhibit normal rotation of the pedal about is axle. This permits the pedal to stay in a horizontal position when not in use. The brake also allows the pedal to be manually positioned to provide an entry pedal attitude that is preferred by the user. The brake member is displaced by the cyclist's foot when the pedal is used so that the brake member no longer engages the pedal axle. The pedal is then free to rotate about the axis to the same extent as if the brake member was not present.

In one embodiment of the invention, a quill pedal includes a pivoted lever arm, an upward protrusion at one end of the arm extending through the top of the pedal axle housing, a spring, and a retainer attached to the protrusion. The lever arm extends along the top of the axle housing and at its other end has a perpendicular brake element that enters the axle housing through a hole in the pedal housing. This brake element bears against the pedal axle and prevents the pedal from rotating about the axle when the rider's foot is not on the pedal. When the rider places his foot on top of the pedal, the rider's shoe sole contacts one end of the lever, compresses the spring, and forces an upward movement of the other end of the lever arm. This forces the brake element away from the pedal axle.

Thus, when the rider's shoe sole is in contact with the pedal, the brake element is raised away from the pedal axle and it allows free rotation of the pedal. When the rider removes his shoe from the pedal, the spring extends and puts pressure against the lever arm and the brake element. The brake elements contacts the axle and stops the pedal's rotation.

Another embodiment of the invention is shown incorporated into the pedal system of U.S. Pat. No. 4,686,867. This pedal system utilizes a triangular shaped shoe cleat which acts like a cam against a hinged and spring tensioned rear hined back plate. When the shoe cleat rotates or is pulled upward, the tensioned back plate pivots and opens and allows the shoe cleat to exit the pedal. A spring mechanism opposes the rear back plate which compresses the spring when pressure is exerted against said back plate by the shoe cleat.

In this embodiment of the present invention, the basic functions of pedal the pedal system of the U.S. Pat. No. 4,686,867 remains intact. In utilizing the brake system of the present, invention with the arrangement of the above-identified U.S. pat., a hole is formed in the rear portion of the pedal body so that a brake element can press against the pedal axle. The brake element is connected to a tensioned shaft with one end of the brake contacting the pedal axle when the pedal body is not in use. When the pedal body is in use, the rear back plate compresses a spring which is attached to the shaft and the brake. This compression pulls the brake away from the pedal axle and allows the pedal to rotate freely. When the shoe cleat is removed from the pedal, the rear back plate moves forward and allows the spring to expand and push the brake against the axle. This prevents any rotation of the pedal.

Yet another embodiment of the invention is shown as comprising a part of the pedal system of co-pending application of Sampson, Ser. No. 016,277 of Feb. 19, 1987. In the Sampson pedal system, a shoe cleat engages a pedal body to compress a horizontally opposed detent mechanism in the pedal body. In the present invention, the detent is connected to springs and to a U-shaped brake that extends over and around the pedal axle. When the shoe cleat is engaged with the pedal, the springs are compressed, and the detent pushes the U portion of the brake away from the pedal axle. This allows the pedal to rotate freely. When the shoe cleat is removed from the pedal, the springs extend and push the brake into its at rest position in which its inner U-shaped surface bears against the pedal axle and stops the pedal from rotating.

Still another embodiment of the invention comprises apparatus that can be utilized on any pedal system with little modification. In this embodiment there is an extension member and a brake member. The extension projects vertically from the top plane of the pedal body. To it is attached a spring and one end of the brake which contacts the pedal axle. When the cyclist places his shoe on the pedal, the extension member is forced down, the spring is compressed and the brake is pushed away from the pedal axle. This allows free rotation of the pedal. When the rider removes his foot from the pedal, the spring extends and raises the vertical extension. This forces the brake against the pedal axle and prevents rotation.

In another embodiment, a spring loaded vertical brake member is forced against the axle when the pedal is not in use, and away from the axle when in use.

It may therefore be observed that the braking system of this invention solves a significant problem associated with prior arrangements and provides an advance in the art.

OBJECT OF THE INVENTION

It is the object of this invention to provide an improved means for allowing easy entry into a bicycle pedal system that does not rotate when it is not engaged with a rider's foot.

It is another object to provide a unique braking system that causes a bicycle pedal to stop rotating about its axle when not in use.

It is another object to provide an improved bicycle pedal braking system which does not affect the pedal's ability to rotate freely about its axle when in use.

BRIEF DESCRIPTION OF DRAWING

These and other objects and advantages of the invention may be better understood from a reading of the following description thereof taken in conjunction with in which.

DETAILED DESCRIPTION

Figure 1:
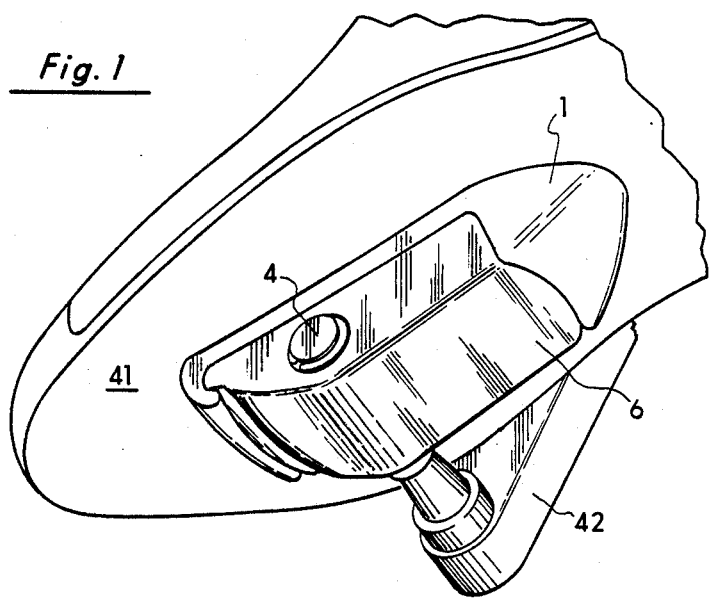
FIG. 1 discloses a pedal system embodying the invention.

FIG. 1 shows one possible exemplary embodiment of the bicycle pedal system of the present invention as comprising a cleat and a pedal body 6. Cleat 1 is attached to a shoe 41 of a cyclist. Pedal body 6 is attached by a shaft 4 to a bicycle crank arm 42. With the cyclist's shoe 41 attached to cleat 1, and with cleat 1 being matingly engaged with pedal body 6, the cyclist's foot may exert pedaling forces against axle 4 and crank arm 42 in a downward manner, in an upward manner, as well as in a forward and backwards manner. The pedal body 6 is retained on axle 4 by means of a suitable retaining mechanism such as a C-spring clip (not shown). The inner end of axle 4 is attached to crank arm 42 by any suitable means such as, for example, by means of male threads on the inner end of axle 4 and cooperating mating female threads in a hole in crank arm 42. In this FIG. 1, as well as in FIGS. 2 through 9, the invention is shown incorporated into the pedal system of the aforementioned co-pending Sampson application.

Figure 2:
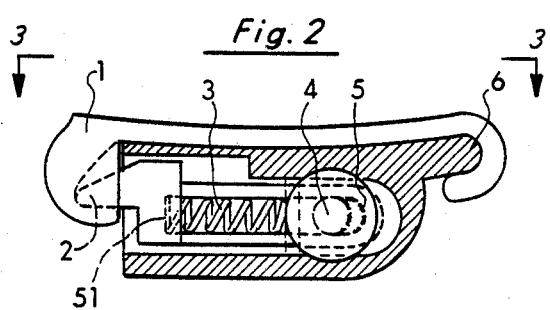
FIG. 2 is a cutaway side view of the embodiment of FIG. 1 with the brake shown disengaged from the axle.

FIG. 2 shows the bicycle pedal body 6 of FIG. 1 as comprising a detent mechanism 2, compression springs 3 and pedal axle 4. A U-shaped brake member 5 (better shown in FIG. 4) is affixed to the right side of detent 2. When the cyclist engages his shoe cleat 1 with the bicycle pedal body 6, it compresses the detent 2 to the right. This pushes the inner surface of the U-shaped brake 5 away from the pedal axle 4. Thus, when cleat 1 is engaged with pedal body 6 and detent mechanism 2 (FIG. 2), contact of the inner U-shaped surface of brake 5 with axle 4 is removed and the pedal can freely revolve around axle 4.

Figure 3:
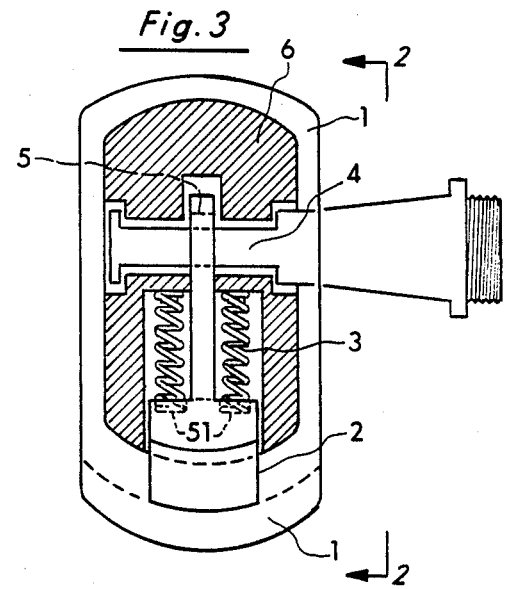
FIG. 3 a cutaway top view of the apparatus of FIG. 2.

FIG. 3 is a cutaway top view of the apparatus of FIG. 2. Cleat 1 is engaged with pedal body 6 and detent 2. At this time, spring 3 is compressed and the inner U-shaped portion of brake 5 is held away from axle 4. Cavities 51 hold springs 3 in place.

Figure 4:
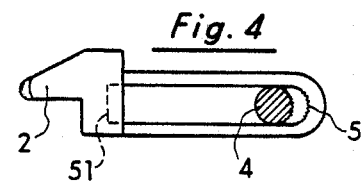
FIG. 4, is a side view of the detent/brake mechanism used in th of FIGS. 2 and 3.
Figure 5:
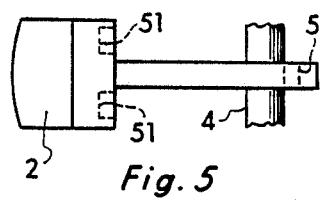
FIG. 5 view of the detent/brake mechanism of FIG. 4.

FIG. 4 is a cross-sectional view of detent mechanism 2 and brake 5. It shows the inner U-shaped portion of brake 5 being held away from axle 4. FIG. 5 is a top view of the apparatus of FIG. 4.

Figure 6:
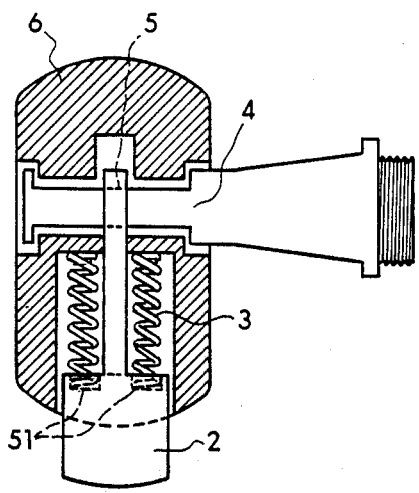
FIG. 6 is a cutaway top view of the apparatus of FIG. 3 illustrating the brake engaged with the axle.

FIG. 6 is a top view cutaway of the apparatus of FIG. 2 when the shoe cleat 1 of FIGS. 1 and 2 is disengaged from pedal body 6. In this illustration, springs 3 push against detent 2 and cause the inner U-shaped surface of brake 5 to bear against axle 4 (better shown in FIG. 8). This prevents pedal body 6 from rotating.

Figure 8:
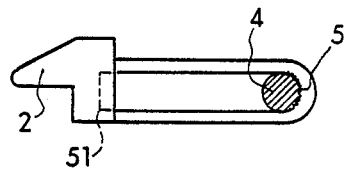
FIG. 8. is a side view of the detent/brake mechanism showing en of the brake with an axle.
Figure 7:
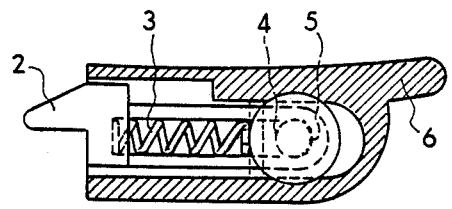
FIG. 7 is a cutaway side view of the apparatus of FIG. 6

FIG. 7 is a cutaway side view of the apparatus of FIG. 6. In this illustration, cleat 1 of the prior illustration is missing. This indicates disengagement of the system. The detent 2 has moved to the left in FIG. 7. This brings the inner U-shaped surface of brake 5 into contact with pedal axle 4. FIG. 8 shows brake 5 bearing against axle 4.

Figure 9:
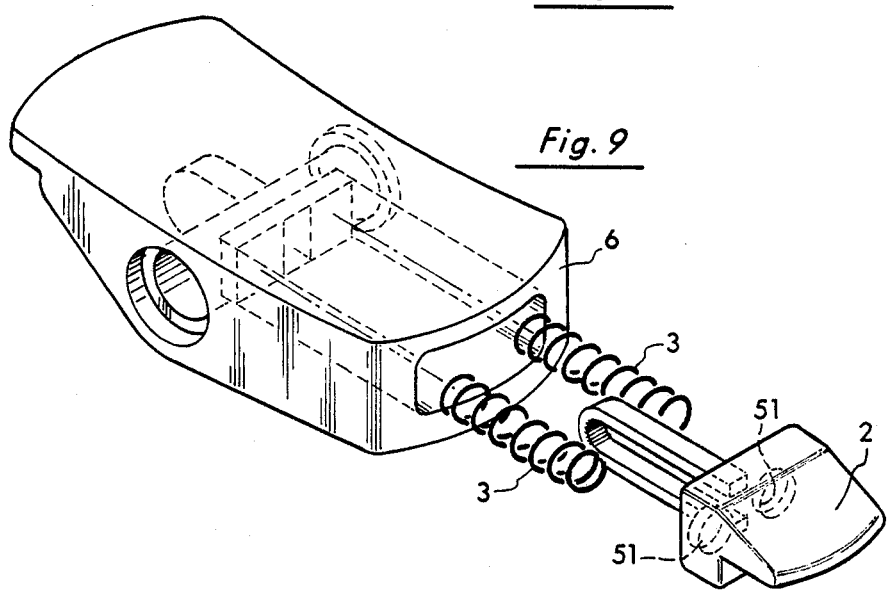
FIG. 9 is an exploded view illustrating the various components of the detent/brake mechanism of FIGS. 2 and 3.

FIG. 9 is an exploded view illustrating how detent mechanism 2, springs 3 and brake 5 are placed into the pedal body 6.

Figure 10:
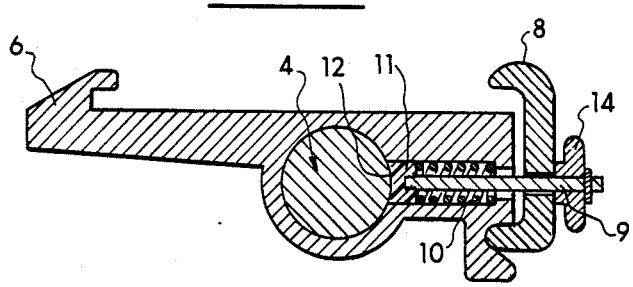
FIG. 10 is a cross-sectional view of an embodiment comprising a part of the pedal system of U.S. Pat. No. 4,686,867 illustrating the brake engaged with the axle.
Figure 11:
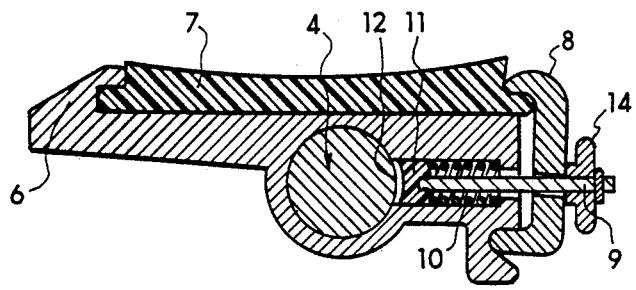
FIG. 11 a cross-sectional view of the apparatus of FIG. 10 illustrating the system in use by a cyclist with the brake not engaged with the axle.

FIGS. 10 and 11 discloses a cutaway side view of the brake system of the present invention as incorporated into the pedal system of U.S. Pat. No. 4,686,867. In FIG. 11, shoe cleat 7 is shown inserted into the top surface of pedal body 6 causing rear retainer plate 8 to push against tensioned shaft 9 and retainer cap 14. This compresses spring 10 and pulls brake 11 away from contact area 12 of axle 4. Pedal body 6 can now freely rotate about axle 4.

FIG. 10 is similar to FIG. 11 except that it shows shoe cleat 7 disengaged from the system. This is the case when the system is not in use by the rider. It can be noted that the rear retainer plate 8 has moved to the left in this illustration. This removes the compression from springs 10 which, in turn, push brake pad 11 to the left so that it bears against contact area 12 of axle 4. This prevents the pedal from rotating about axle 4.

Figure 12:
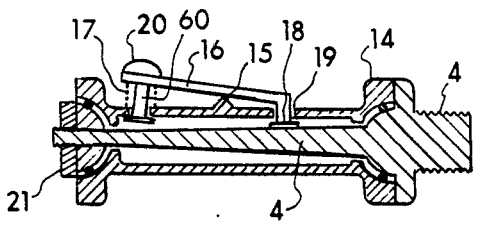
FIG. 12 is a cross-section of a typical quill pedal spindle equipped with another embodiment of the present invention with the brake mechanism in the "on" position.

FIG. 12 illustrates a cross-sectional view (taken along line 12—12 of FIG. 15) of an embodiment that which can be utilized with the typical quill pedal. In this embodiment, a pedal axle 4 is inserted through a pedal housing 14 and is attached with a retainer nut 21 on the outer end of the axle. The right end of axle 4 matingly attaches to a bicycle crank arm (not shown). A pivot hinge 15 is attached to the top surface of the pedal housing 14 and to the bottom of lever arm 16. An upward protrusion 20 of arm 16 extends above the top surface of the plane of the pedal and holds spring 17.

Lever arm 16 extends to the right and, on its right end, a downward protrusion of arm 16 enters the top of the pedal housing 14 through a hole 19 in the top of said housing. This right side extension of arm 16 protrudes downward and is attached to a brake plate 18 which has a diameter larger than the hole 19 in the top of the pedal housing 14. This prevents accidental ejection of the brake. In FIG. 12, the system is shown at rest; therefore, the spring 17 is in its extended position and forces the left end 20 of lever 16 upwards. This forces brake 18 into contact with pedal axle 4 and creates a drag on the pedal to cause it to cease rotation.

Figure 13:
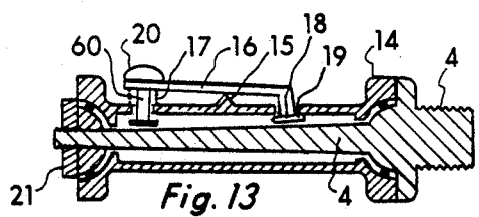
FIG. 13 is a front view of the pedal of FIG. 12 with the brake mechanism in the "off" position.

FIG. 13 illustrates the released state of the brake mechanism of FIG. 12. In this illustration, force is applied to the top of the protrusion 20 by placement of the rider's shoe on top of the pedal housing 14. The rider's shoe forces protrusion 20 down, compresses spring 17 and pivots lever 16 about pivot hinge 15. This raises the brake 18 upwards and away from the pedal axle 4 and toward hole 19. The force from the rider's shoe has now brought the brake 18 out of contact with pedal axle 4. This allows the pedal to revolve freely about axle 4.

Figure 14:
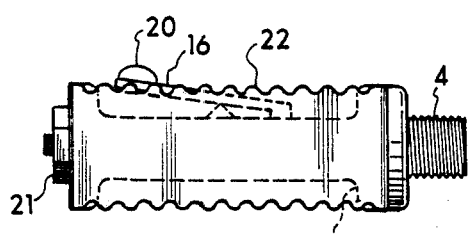
FIG. 14 illustrates a cross-section front view of the apparatus of FIG. 12 illustrating the brake in the on position.

FIG. 14 is a full front view (taken along line 14—14 of FIG. 15) of a quill pedal equipped with the braking system of FIG. 12 and 13. In this view, it can be observed that protrusion 20 and the lever arm 16 are visible over the top plane of the pedal. When the rider places his foot in the top of the cage plates 22, he depresses protrusion 20 and the left end of lever arm 16 to free brake 18 from axle 4.

Figure 15:
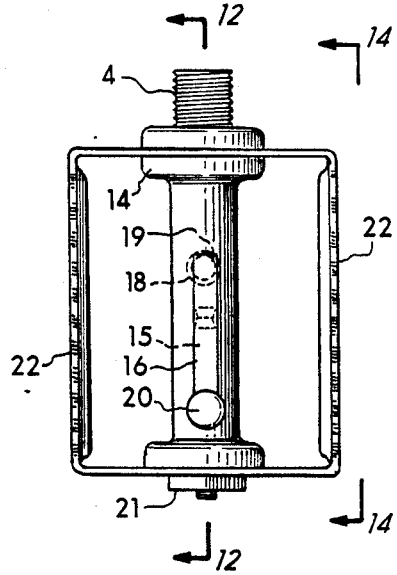
FIG. 15 is a top view of the embodiment of FIG. 12 illustrating the positioning of the brake mechanism on top of a pedal.

FIG. 15 is a top view of the apparatus of FIGS. 12, 13, and 14 and illustrates the general positioning of the brake assembly when viewed from this perspective. This view illustrates a cage-type assembly 22 which is attached to the axle housing 14. This assembly rotates around pedal axle 4. The brake mechanism is located roughly in the top center of the pedal housing 14 as shown.

Figure 16:
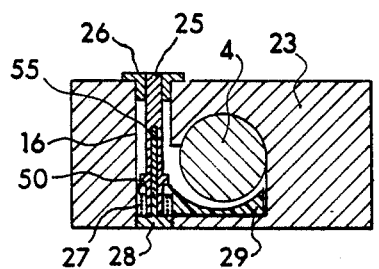
FIG. 16 is a cross-sectional view of another possible embodiment illustrating disengagement of the brake system when the pedal is used by a rider.

FIG. 16 illustrates an another embodiment of the brake mechanism of the invention. In this illustrative cutaway view, there is a pedal body 23 which rotates around a pedal axle 4. There is an upward extension 25 which protrudes through the top plane of the pedal 23 and which, on its lower end movably fits over pin 55 within pedal 23. A retainer cap 26 is affixed to the top of the pedal body 23 and has an inside diameter slightly larger than the outside diameter of the extension 25. This retainer cap 26 retains the assemblage of parts inside the pedal. The left end of brake member 29 encircles pin 55 and rests atop spring 27. When the rider places his shoe on top of the extension 25, it moves pin 55 downward and presses collar 50 against the left end of brake 29. This compresses the spring 27 down against cap 28. This forces brake 29 down and removes the contact between brake 29 and the pedal axle 4. This allows the pedal body 23 to rotate freely about its axle 4.

Figure 17:
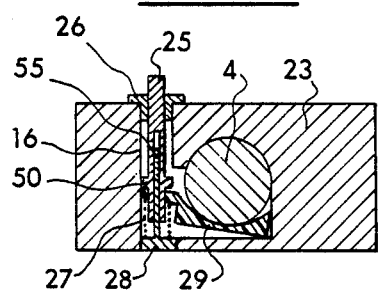
FIG. 17 is a cross-sectional view of the apparatus of FIG. 16 with the brake engaged with the axle.

FIG. 17 depicts the embodiment of FIG. 16 while the system is at rest or not in use. As can be observed from the cross-sectional view, when the rider's foot is removed, extension 25 moves up on pin 55 and extends out of the top plane of pedal body 23. The spring 27 is extended and pushes against brake 29 which, in turn, contacts the pedal axle 4. This causes the pedal body 23 to cease rotation about its axle 4.

Figure 18:
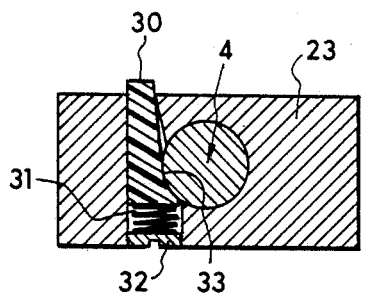
FIGS. 18 and 19 disclose another possible embodiment of the invention.

FIG. 18 illustrates a cross section view of another possible embodiment of the present invention. In this embodiment, a pedal body 23 rotates around a pedal axle 4, which is affixed to a bicycle crank arm (not shown). An upward protrusion 30 extends out of the top plane of pedal body 23. Spring 31 is located under the extension 30 and is retained by a threaded cap 32 which is inserted into the lower surface of the pedal body 23. When the cyclist's foot is off of the pedal, the upward extension 30 is fully extended. This brings the angled braking surface 33 of extension 30 into contact with pedal axle 4.

Figure 19:
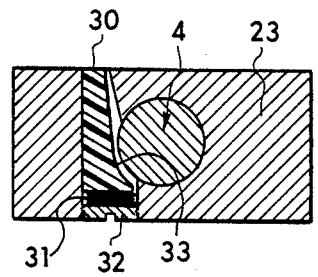

FIG. 19 is a view of the apparatus of FIG. 17 when it is engaged by the cyclist's foot. In this illustration, extension 30 is depressed by the rider's shoe and compresses spring 31 against threaded cap 32. This pushes the angled braking surface 33 of extension 30 away from pedal axle 4 and allows the pedal body 23 to rotate freely.

While preferred embodiments of the present invention have been shown, it is to be expressly understood that modifications and changes may be made thereto and that the present invention is set forth in the following claims.

I claim :

1. A bicycle pedal system comprising:
    a bicycle body and a horizontally disposed axle about which said body can rotate;
    means for applying pressure generated by the shoe of a cyclist to said pedal body;
    horizontally movable brake means for contacting said axle to inhibit rotation of said pedal body about said axle when said pressure applying means is applied to said pedal body, and
    horizontally movable means responsive to said pressure applying means ap body to disengage said brake means from said axle so that said pedal body can rotate freely about said axle.

2. A bicycle pedal system comprising:
    a bicycle pedal body and a horizontally disposed axle about which said body can rotate;
    a horizontally oriented brake element positioned within said pedal body so that said axle extends perpendicular to said brake element,
    means for applying pressure generated by the shoe cleat of a cyclist to said pedal body;
    means for moving said brake element horizontally in a first direction to force a surface on said brake element against said axle to inhibit rotation of said pedal body about said axle when said pressure applying means is not applied to said pedal body; and
    means responsive when said pressure applying means is applied for moving said brake element horizontally in a second direction to move said surface away from said axle to enable said rotation.

3. The system of claim 2 wherein said element, said moving means and said responsive means comprise:
    a horizontally oriented shaft extending into the interior of said pedal body to a position adjacent said axle;
    spring means for normally forcing an inner end of said shaft inwardly so that said inner end bears against said axle to inhibit said rotation when said pressure applying means is not applied and,
    means responsive to the engagement of a cleat of a cyclist's shoe with said pedal body as said pressure applying means is applied for moving said inner end of said shaft away from said axle to enable said rotation.

4. The system of claim 2 wherein said brake element, said responsive means, said surface and said moving means comprise:
    a vertically oriented back plate on said pedal body
    a horizontally oriented shaft having an outer end extending through said back plate and having an inner end extending into the interior of said pedal body to a position adjacent said axle;
    a brake pad on said inner end of said shaft,
    spring means normally forcing said shaft inwardly so that said brake pad is forced against said axle to inhibit rotation of said pedal when said pressure applying means is not applied,
    said plate being adapted to be forced outwardly on its upper end when said pressure applying means is applied as a cleat of a shoe of a cyclist engages said pedal body, and
    means responsive to the outward movement of said back plate for moving said brake pad away from said axle to enable said rotation.

5. A bicycle pedal system comprising:
    a bicycle pedal body and a horizotally disposed axle about which said body can rotate;
    a horizontally oriented U-shaped brake element positioned within said pedal body so that said axle extends perpendicular to and through an inner portion of said U-shaped element,
    means for forcing an inner surface of a U-shaped portion of said brake element against said axle to inhibit rotation of said pedal body about said axle when , said pedal body is not engaged by a cleat of a cyclist s shoe;
    means for applying pressure generated by the shoe cyclist to said pedal body; and
    means responsive to said pressure applying means for displacing said inner U-shaped surface away from said axle to enable said rotation when said cleat applies pressure to said pedal body.

6. A bicycle pedal system comprising:
    a bicycle pedal body and a horizontally disposed axle about which said pedal body can rotate;
    a normally extended and horizontally movably detent in said pedal body,
    a U-shaped brake element having the legs of said U horizontally oriented and with the ends of said legs being affixed to an inner side of said detent, said U-shaped brake element being positioned within said pedal body so that said axle extends perpendicular to and between said legs of said U-shaped element,
    spring means for forcing said detent outwardly from said pedal body so that an inner surface of a U-shaped portion of said brake element bears against said axle to inhibit rotation of said body about said axle when said pedal body is not engaged by a cleat of a rider's shoe, and
    means for forcing said detent inwardly against said spring means and towards said pedal body when said cleat engages said pedal body so that said inner surface is moved away from contact with said axle to enable said rotation.

7. A bicycle pedal system comprising:
    a bicycle pedal body and a horizontally disposed axle about which said pedal body can rotate,
    a vertically oriented back plate on said pedal body,
    means for enabling said plate to pivot rearwardly about a lower end of said plate, a horizontally oriented shaft within said pedal body having an outer end extending rearwardly through an opening in said plate with said shaft having an inner end extending towards the center of said pedal body to a position adjacent said axle;

a brake pad on said inner end of said shaft, spring means concentric to said shaft for normally forcing said shaft inwardly so that said brake pad is forced against said axle to inhibit said rotation, a cam surface on an upper end of said back plate for pivoting said upper end of said plate rearwardly when a shoe cleat of a cyclist engages said pedal body, and collar means affixed to said outer end of said shaft and responsive to the rearward pivoting of said back plate for moving said shaft and said brake pad away from said axle to enable rotation of said pedal body about said axle.

8. A bicycle pedal system comprising:

a bicycle pedal body and an axle about which said pedal body can rotate;

horizontally movable brake means, means for forcing said brake means against said axle to inhibit rotation of said pedal body about said axle, and horizontally movable means responsive to pressure applied by a cleat of a cyclist's shoe on said pedal body to disengage said brake means from said axle so that said pedal body can rotate freely about said axle.

9. The bicycle pedal system of claim 8 wherein said brake means comprises a horizontally oriented brake element position said pedal body so that said axle extends perpendicular to and through an open portion defined by said brake element, said means for forcing comprises means for forcing an inner surface of said open portion of said brake element against said axle to inhibit rotation of said pedal body about said axle when pressure is not applied to said pedal body by a cleat of a cyclist's shoe;

and said responsive means comprises means responsive when said pressure is applied for displacing said inner surface away from said axle to enable said rotation.

* * * * *